(12) United States Patent
Beatty

(10) Patent No.: US 10,248,905 B1
(45) Date of Patent: Apr. 2, 2019

(54) SYSTEM FOR TRACKING STUDENTS

(71) Applicant: Lane Beatty, Naples, FL (US)

(72) Inventor: Lane Beatty, Naples, FL (US)

( * ) Notice: Subject to any disclaimer, the term of this patent is extended or adjusted under 35 U.S.C. 154(b) by 0 days.

(21) Appl. No.: 15/661,075

(22) Filed: Jul. 27, 2017

(51) Int. Cl.
*G06K 5/00* (2006.01)
*G06K 19/10* (2006.01)
*G06K 7/10* (2006.01)
*G06K 7/14* (2006.01)
*G06Q 50/20* (2012.01)
*G06F 17/30* (2006.01)

(52) U.S. Cl.
CPC ......... *G06K 19/10* (2013.01); *G06K 7/10762* (2013.01); *G06K 7/1413* (2013.01); *G06Q 50/20* (2013.01); *G06F 17/30864* (2013.01)

(58) Field of Classification Search
CPC ............ G06K 19/10; G06K 19/06018; G06K 19/06028; G06K 7/1404; G06K 7/1413; G06K 7/1417
See application file for complete search history.

(56) References Cited

U.S. PATENT DOCUMENTS

| 4,223,918 | A | * | 9/1980 | Smoczynski | .... G06K 19/06028 283/111 |
| 4,531,765 | A | * | 7/1985 | Shulman | ................ B42D 25/23 156/108 |
| 5,218,344 | A | | 6/1993 | Ricketts | |
| 5,423,574 | A | | 6/1995 | Forte-Pathroff | |
| 5,505,494 | A | | 4/1996 | Belluci et al. | |
| 6,774,797 | B2 | | 8/2004 | Freathy et al. | |
| 6,992,566 | B2 | | 1/2006 | Striemer | |
| 7,233,240 | B2 | * | 6/2007 | Phillips | ................. G06K 17/00 340/539.13 |
| 8,761,360 | B1 | * | 6/2014 | Gongaware | ............ H04M 3/38 379/142.05 |
| 9,189,942 | B2 | | 11/2015 | Roston | |
| 9,224,296 | B1 | | 12/2015 | Wu et al. | |
| 9,576,491 | B1 | | 2/2017 | Wu et al. | |
| 9,977,935 | B1 | * | 5/2018 | Laranang | ........... G07C 9/00031 |
| 2005/0131625 | A1 | * | 6/2005 | Birger | .................... G06Q 10/08 701/117 |
| 2005/0219056 | A1 | | 10/2005 | McHugh et al. | |
| 2006/0017541 | A1 | | 1/2006 | Nguyen | |
| 2007/0008138 | A1 | | 1/2007 | Mosher, Jr. et al. | |
| 2007/0024440 | A1 | | 2/2007 | Moran et al. | |
| 2014/0125502 | A1 | | 5/2014 | Wittkop et al. | |
| 2014/0257848 | A1 | * | 9/2014 | Heppding | .......... G06Q 20/3574 705/3 |
| 2016/0350567 | A1 | * | 12/2016 | McQuade | ................ G08G 1/20 |

\* cited by examiner

*Primary Examiner* — Thien M Le
*Assistant Examiner* — April A Taylor
(74) *Attorney, Agent, or Firm* — Edward M. Livingston, Esq.; Bryan L. Loeffler, Esq.; Livingston Loeffler, P.A.

(57) ABSTRACT

A system for student check in and check out wherein unique identification badges are used in conjunction with a centralized communication system to maintain a database of each student's intended destinations on a day to day basis, thereby ensuring each student is transported to a correct intended destination and tracked throughout the process.

7 Claims, 2 Drawing Sheets

SYSTEM FOR TRACKING STUDENTS

FIELD OF THE INVENTION

This invention relates to child and student safety, and more particularly, to a system for improving child safety by ensuring each student leaving a school arrives at his or her intended destination and tracking the process throughout.

BACKGROUND OF THE INVENTION

The ability of a school, after school program and/or parent to know that a child has safely boarded the correct bus and exited at the correct stop after school has ended is currently very limited or doesn't exist. Children normally have three options when leaving school depending on each child's intended destination: One option is to board a school bus that is intended to take the child home; a second option is to board a school bus that is intended to transport the child to an after school care provider; and a third option is to have alternate transportation, such as being picked up by a guardian or biking or walking home. These options may change from day to day for each student. Of course, the correct destination for a student on any given day must be communicated by the student's guardian to the school who then must ensure the student is transported to the correct destination.

Currently a system does not exist to ensure students are boarding the correct busses and to keep track of attendance of students on buses. Currently, schools do not have a centralized system for organizing the dismissal of students onto busses and tracking students throughout that process. Therefore, schools have no record or verification system to tell them what bus a student boarded and where the student is after he or she has stepped onto a bus. This causes a great deal of confusion, especially when a student intentionally or unintentionally boards the incorrect bus.

For example, a student may incorrectly board a bus that takes the student home sometimes to an empty and locked house. As a result, the student ends up alone and unsupervised at home for an extended period of time.

Another example is if a student boards an incorrect bus altogether and gets off the bus at a stop that is nowhere near his or her home.

In any of these cases, there is no record of how the student left school and hours can pass by the time anyone realizes the child is missing and not where they are supposed to be.

This problem exists not only for the schools but also for after school care providers that are responsible for the safety of the students being transported from the school to the after school care provider. The lack of an automated tracking system on the bus and communication between the school and the after school program can lead to children becoming lost. Even the use of conventional attendance tracking methods does not prevent the loss of children and delays the discovery that a child is not in the correct place for an unacceptable period of time, which can be hours. For example, when students arrive at an after school care provider, they are checked in manually with pencil and paper and then that attendance may be entered into a software component. This method is inefficient and time consuming and can lead to errors in the check in process.

In addition, the attendance records are only accessible from the school or location where the attendance was entered. Therefore, there is no real time communication between the guardian, school and after school care provider so that any of the three interested parties can at any time determine where the child is supposed to be transported to after school, where the child is during the transportation process and to where the child was transported.

Therefore, a need exists for a system and method for centralizing communication between guardians, school personnel and after school care providers in a tracking system that ensures students are boarding the correct buses based on predetermined destinations and safely arriving at those predetermined destinations.

SUMMARY OF THE INVENTION

The primary object of the present invention is to provide a system for improving child safety by ensuring each student leaving a school arrives at his or her intended destination and tracking the process throughout.

The present invention fulfills the above and other objects by providing unique identification badges used in conjunction with a centralized communication system to maintain a database of each student's intended destinations on a day to day basis, thereby ensuring each student is transported to a correct intended destination and tracking the location of each student throughout the process. The system of the present invention employs color coded identification badges that are preferably attached to students' backpacks or lunch boxes by a clip. Each identification card is color coded to indicate the after school destination of each student. For example, yellow identification cards would be provided to students riding buses to their homes. A contrasting color, such as blue identification cards, would be provided to students attending onsite after school care providers. A contrasting color, such as green identification cards, would be provided to students who walk or ride bikes home from school or are being picked up by guardians. The color coding will provide a visual cue to any teachers or other school personnel that a student is on their way to the correct form of transportation. The color coded identification badges may also include student information including name, grade level, teacher, photo, and a barcode.

The barcode may be scanned at various checkpoints throughout a dismissal process and arrival process, such as if the student is arriving at an after school care provider, using an electronic device, such as a smart phone, tablet or equivalent portable electronic device. For example, the barcode may be scanned as a student is boarding a bus to ensure the student is boarding the correct bus and to provide a time-stamped confirmation that the student boarded the bus. The bar code may then be scanned when the student arrives at an after school care provider to provide a time-stamped confirmation that the student has been dropped off and is now in the care of the after school care provider.

The color coded badges and barcodes provide a funneling process to allow the students to be directed toward the correct destination. First, in groups with the color coded identification badges and then individually with each student's barcode being scanned.

The system of the present invention provides alerts so as soon as a student is checked in, a guardian can be alerted via text, email or a mobile application as to their student's whereabouts and the time they were checked in, thereby providing peace of mind for the parent.

In the occurrence that a guardian calls the school and says that their student needs to change his or her after school destination for that day, the office attendant will then enter the change into the software that interacts with the central database on a secure server. The system will then alert a teacher that has the student in his or her class of the change.

The teacher will then be responsible for ensuring that the student switches colored identification cards if necessary.

The students will then all proceed to their after school destinations at the end of the school day. Utilizing the color coding on the badges, any teacher or assistant that encounters a student on their way to their destination can verify that the student is heading toward the correct dismissal point. Once the student arrives at his or her dismissal point, such as at a bus, the attending teacher or assistant will use the barcode scanner or tablet computer to scan the student's identification badge. The teacher or assistant will then be presented with feedback on the barcode scanner or tablet computer confirming that the student is attempting to go to the correct after school destination. If the student is not at his or her correct dismissal point, feedback will be presented to the teacher or assistant via the barcode scanner or tablet computer to instruct them where the student should go. This situation is more likely to occur when a student has had his or her after school destination changed for the day, and the office did not pass along the information to the teacher, or the teacher did not pass along the information to the student to change his or her badge color, or the student simply forgot to change his or her badge color for the day after being informed by the teacher. Regardless, the continuously updated remote database will be able to catch these mistakes before it is too late. Additionally, if there is a problem scanning the student's badge, or if the student's badge is missing, the student's name can be searched in the database and be checked in manually by the teacher or assistant.

The proposed system will also provide a means for onsite after school care providers to check all students in and out for both safety and for billing purposes. The students will be checked in upon arriving at the onsite after school care provider, giving the after school care provider's administrators the ability to monitor which students are arriving at the after school care provider for the day in real time. When a guardian on an approved pickup list arrives to pick up their student at the end of the day, the student may then be checked out using the system of the present invention. The time-stamped check in and check out times may then be used to generate billing invoices for the time the student was in the care of the after school care provider.

The software for the system will be built as a web application so that the user can log in to the system from any device with internet access. As a result, all information will be stored on a remote secure server with continuous backup capabilities. This will ensure that there is no risk of data loss and a local computer failure will not result in a system wide failure. All barcode scanners and tablet computers will be connected to the server through a Wi-Fi network enabling connection to the internet. The system will be extremely modular to ensure reliability and ease of use. Whenever a barcode scan is performed to check a student in or out, the transaction is immediately synchronized with the remote server providing live feedback to any administrators or office personnel that are monitoring the system from a control point. A control point is defined as a main location where an instance of the software is being run to give overview capabilities.

The control point allows the school's office administrators to see in real time which students are loaded on each bus and which students have been checked into an after school care provider. The control point is also the mechanism through which office personnel will make changes to each student's after school destinations in the event of a change. The control point will give the office administrators the ability to give parents correct feedback if they call inquiring as to their student's whereabouts after school. Having this control point gives the school the ability of getting all students safely to their correct after school destinations.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
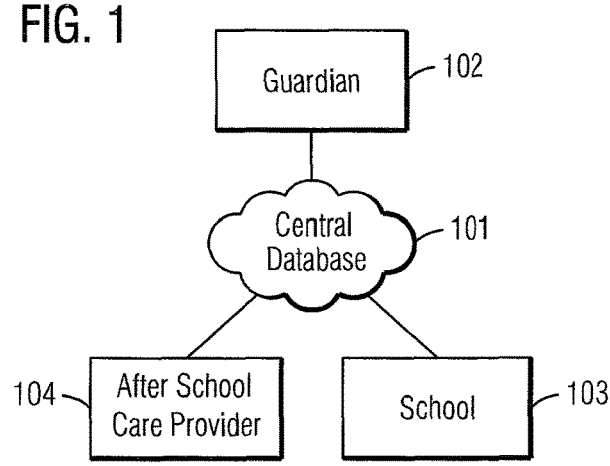
FIG. 1 is a block diagram of a computing environment in which the system of the present invention is performed.
Figure 2:
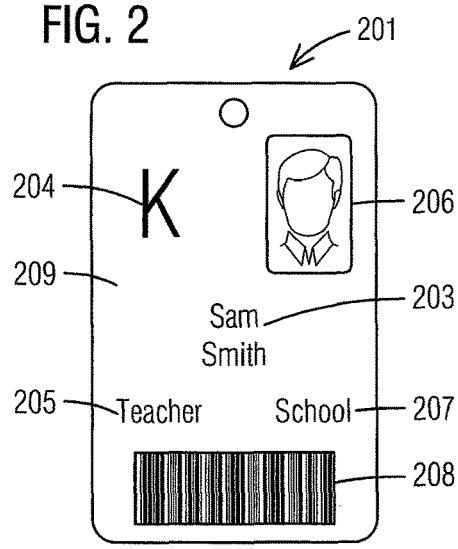
FIG. 2 is a front view of a color coded identification card of the present invention.

With reference to FIG. 1, a block diagram of a computing environment in which the system of the present invention is performed is illustrated. A central online database 101 is in communication via a secure server with electronic devices of at least one guardian 102, at least one school 103 and at least one after school care provider 104. The central online database may be manually updated with information regarding a student by the at least one guardian 102, at least one school 103 and at least one after school care provider 104. For example, if a student is to go to an after school care provider on a given day, then the guardian may update the student's destination within the online database 101 via an electronic device, such as a computer, smart phone or tablet. The school will then be alerted to change the student's color coded identification badge, as illustrated in FIGS. 1 and 2, if necessary. When a barcode on the students color coded identification badge is scanned, using an electronic device such as a smart phone, tablet or equivalent device, the online database will provide the intended destination for a particular day and a time-stamped confirmation if the scan being performed will be stored in the online database along with the location of the scan, such as the bus the student is boarding or the after school care program the student has arrived at. Updates may be sent the guardian via text or email each time the online database is updated for with information pertaining to the guardian's student.

Figure 3:
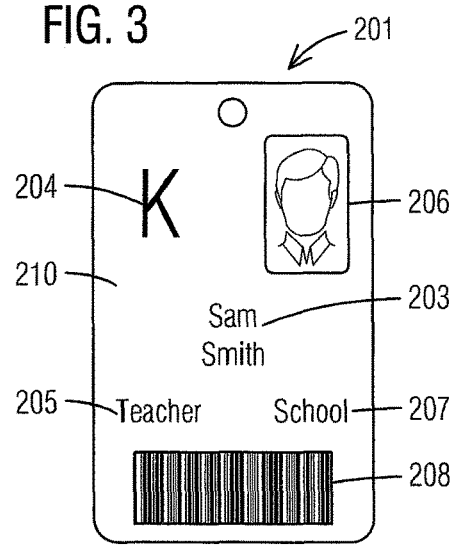
FIG. 3 is a rear view of a color coded identification card of the present invention.
Figure 4:
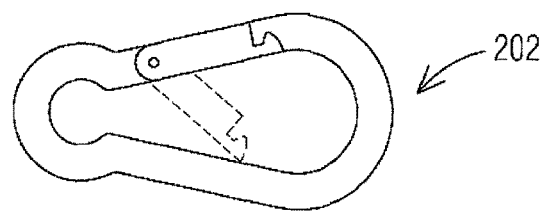
FIG. 4 is a side view of a clip used for attaching the color coded identification card of the present invention to a student's backpack or lunchbox.

With reference to FIGS. 2-4, the system of the present invention comprises a double sided color coded identification badge 201 that is preferably attached to each student's backpack or lunch box by a clip 202, such as a carabiner. Each color coded identification card 201 is color coded to indicate which after school destination the student should arrive at. For example, yellow identification cards would be provided to students riding buses home. A contrasting color, such as blue identification cards, would be provided to students riding buses to an after school care provider. A contrasting color, such as green identification cards, would be provided to students who walk or ride bikes home from school. The color coding will provide a visual cue to any teachers or other school personnel that a student is on their way to the correct form of transportation, bus and/or destination. The color coded identification badges 201 may also comprise student information, such as the student's name 203, grade level 204, teacher 205, photo 206, school 207 and a barcode 208. The student information is preferably listed on a front side 209 of the color coded identification badge 201 and a back side 210 of the color coded identification badge 201.

Since most students go to the same after school destination every day, they will not need to change their color coded identification badges 201 often. However, if a student's after school destination is changed on a particular day, then a central database will be updated and the student's color coded identification badge 201 will be changed prior to being dismissed from the school. Utilizing the color coded identification badges 201, any teacher or assistant that encounters a student on their way to their destination can verify that the student is heading toward the correct destination.

Figure 5:
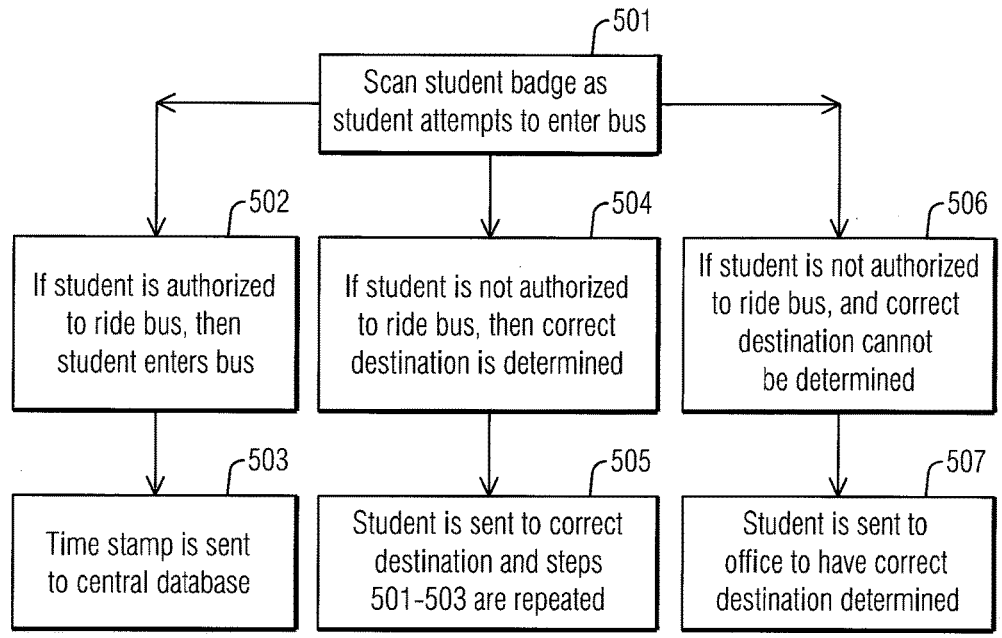
FIG. 5 is a flow chart showing the steps for checking one or more students into a bus.

With reference to FIG. 5, a flow chart showing the steps for checking one or more students into a bus is illustrated. First, one or more school personnel waits at an entrance of a school bus for students to arrive at the school bus and each student's color coded identification badge is scanned using a mobile electronic device, such as a smart phone, tablet or equivalent electronic device 501. If the student is authorized to board the bus, then the student is allowed to board the bus 502 and a time-stamped confirmation of the student boarding the bus is sent to the online database 503. If the student is not authorized to board the bus, then the correct destination is determined 504 and the student is sent to the correct bus 505. Then, steps 502-503 are repeated at the new bus. If the correct destination cannot be determined 506, then the student may be sent to the administrative office of the school to have the correct destination determined 507.

Figure 6:
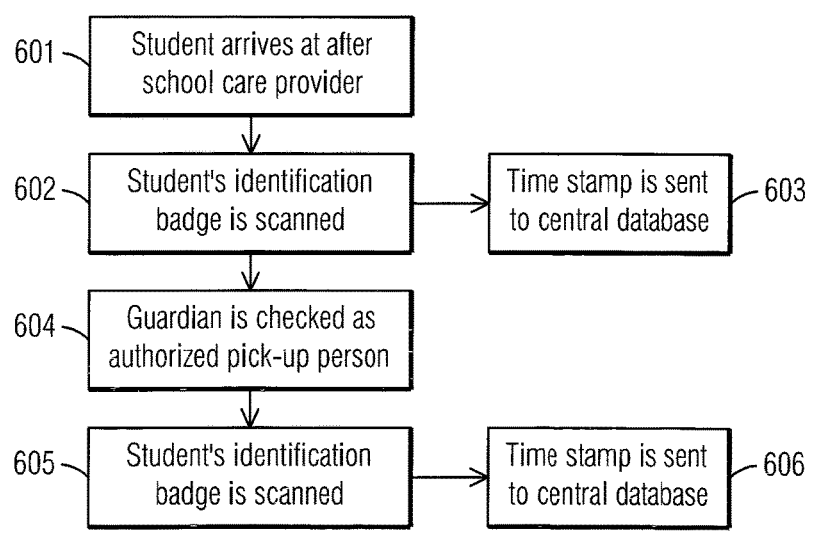
FIG. 6 is a flow chart showing the steps for checking one or more students into and out of an after school care provider.

With reference to FIG. 6 a flow chart showing the steps for checking one or more students into and out of an after school care provider is illustrated. First, the student arrives at an after school care provider on a bus 701. Then, the student's identification badge is scanned by an after school care provider personnel 702 and a time-stamped confirmation of the student arriving at the after school care provider is sent to the online database 703. Then, when the student is being picked up by a guardian, the guardian is confirmed as an authorized pickup person 704. Then, the student's identification badge is scanned by an after school care provider personnel 705 and a time-stamped confirmation of the student leaving the after school care provider is sent to the online database 706.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A system for tracking one or more students throughout a dismissal process comprising:
    a barcode being assigned to a student;
    at least one identification badge having the bar code located thereon and a clip for attaching the at least one identification badge to an object carried by the student;
    said at least one identification badge being color coded with a specific color indicating an authorized destination at which the student carrying the at least one identification badge should arrive;
    a central online database in communication via a secure server with at least one electronic device possessed by school personnel;
    said central online database in communication via the secure server with at least one electronic device possessed by an after school care provider;
    said central online database in communication via the secure server with at least one electronic device possessed by a guardian;
    the after school care provider being saved as the authorized destination in the central online database;
    said bar code being scanned by the at least one electronic device in possession of the school personnel during dismissal of the student from the school to verify that the at least one identification badge provided to the student is heading toward the authorized destination;
    said bar code being scanned by the at least one electronic device in possession of the after school care provider;
    a determination being made that the at least one identification badge is at the authorized destination;
    a time-stamp being created and saved in the central online database; and
    said time stamp being sent to the at least one electronic device possessed by the guardian.

2. The system of claim 1 wherein:
    said at least one identification badge is double sided having a front side and a back side wherein said bar code is printed on the front side and the back side.

3. The system of claim 1 wherein:
    said at least one electronic device is a tablet.

4. The system of claim 1 wherein:
    said at least one electronic device is a smart phone.

5. A system for tracking one or more students throughout a dismissal process comprising:
    a barcode being assigned to a student;
    at least one identification badge having the bar code located thereon and a clip for attaching the at least one identification badge to an object carried by the student;
    said at least one identification badge being color coded with a specific color indicating an authorized destination at which the student carrying the at least one identification badge should arrive;
    a central online database in communication via a secure server with at least one electronic device possessed by school personnel;
    said central online database in communication via the secure server with at least one electronic device possessed by an after school care provider;
    said central online database in communication via the secure server with at least one electronic device possessed by a guardian;
    the after school care provider being saved as the authorized destination in the central online database;
    said bar code being scanned by the at least one electronic device in possession of the school personnel during dismissal of the student from the school to verify that the at least one identification badge provided to the student is heading toward the authorized destination;
    said bar code being scanned by the at least one electronic device in possession of the after school care provider;

a determination being made that the at least one identification badge is at the authorized destination;

a time-stamp being created and saved in the central online database; and said time stamp being sent to the at least one electronic device possessed by the guardian; and said at least one identification badge is double sided having a front side and a back side wherein said bar code is printed on the front side and the back side.

6. The system of claim 5 wherein:

said at least one electronic device is a tablet.

7. The system of claim 5 wherein:

said at least one electronic device is a smart phone.

\* \* \* \* \*